Nov. 26, 1929.                G. BENSON                1,736,843
                         DUAL CONTROL SILL COCK
                          Filed March 5, 1928
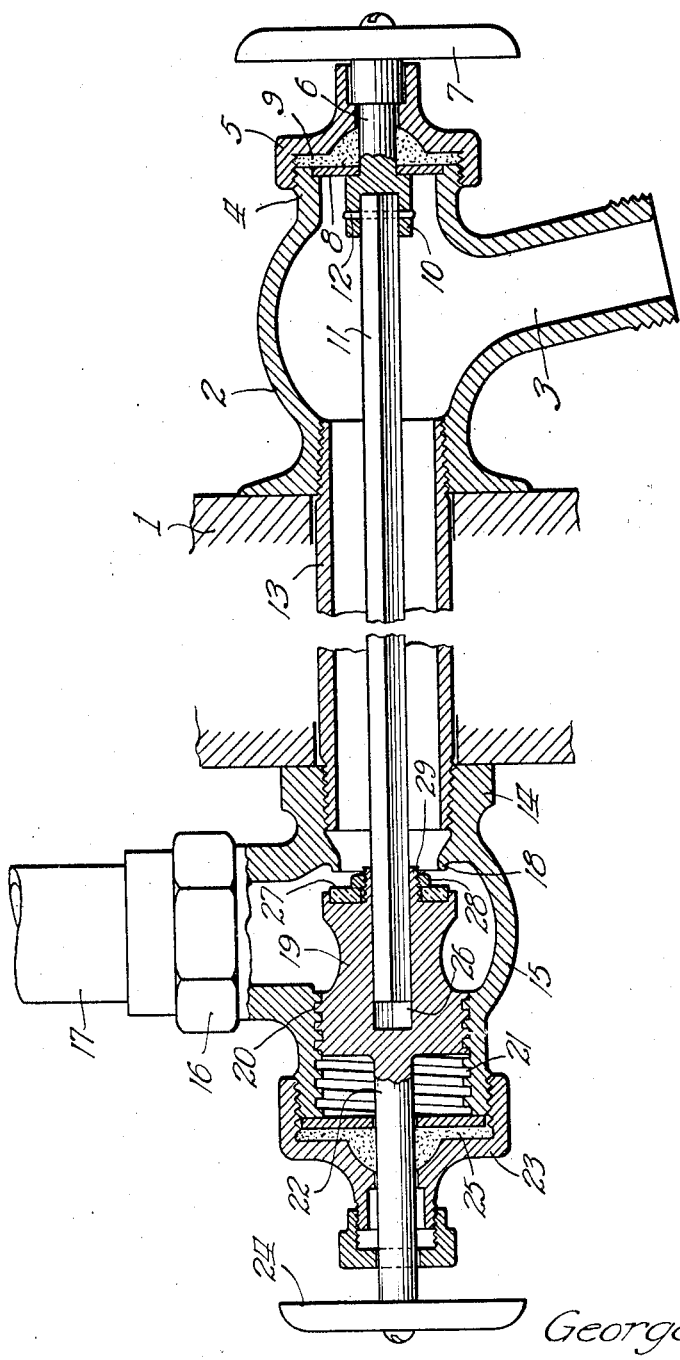
Inventor
George Benson
By Zabel & Banning
Attys Patented Nov. 26, 1929

1,736,843

UNITED STATES PATENT OFFICE

GEORGE BENSON, OF HINSDALE, ILLINOIS

DUAL-CONTROL SILL COCK

Application filed March 5, 1928. Serial No. 259,175.

My invention relates to sill cocks or faucets and has for its purpose the provision of a device of this character which shall be simple in construction and which shall embody means whereby the flow of water may be turned off either from within the building or from the exterior thereof.

It is also a purpose of this invention to provide a device of this character wherein the valve controlling the flow of water is located at the opposite side of the wall from the discharge faucet and which is movable independently of the operating means carried by the faucet.

More particularly it is a purpose of this invention to provide a sill cock comprising a faucet adapted to be placed on the outer face of the wall, a pipe for extending through the wall and a valve on the inner face of the wall having its outlet connected to the pipe together with means associated both with the valve and with the faucet whereby the valve may be operated from the exterior of the wall or from the interior at will.

Other objects and advantages of the invention will appear as the description proceeds in connection with the accompanying drawings. However, I wish it to be distinctly understood that I do not intend to limit myself to the exact details shown and described, but that I intend to avail myself of all such modifications as would occur to one skilled in this art and as fall within the scope of the claims.

In the drawings:

The figure is a sectional view showing my improved device as applied to a wall.

Referring now in detail to the drawings, the numeral 2 indicates a faucet having the downwardly curved discharge outlet 3 and having at its outer end 4 a screw threaded cap 5 which cap serves as a journal for the rotatable shaft 6 mounted therein. The shaft 6 has a handle 7 thereon for rotating the same, a washer 8 and a packing 9 serve to make a water tight joint at the outer end of the faucet. The shaft 6 is enlarged at its inner end as shown at 10 to receive the square rod 11 which may be held therein by any suitable means such as the pin 12.

Extending from the faucet through the wall 1 is a pipe 13 which is connected on the other side of the wall to the outlet end 14 of a valve casing 15. The rod 11 also extends through the pipe 13 into the casing 15. The valve casing is provided with a coupling indicated generally at 16 for connection to water supply pipe 17. Adjacent the outlet 14 the casing is provided with a valve seat 18 with which the valve 19 cooperates to cut off or permit the flow of water to the faucet 2.

The valve 19 as shown is provided with external screw threads as indicated at 20 cooperating with internal screw threads 21 on the casing whereby upon rotation of the valve it may be moved toward or away from the valve seat 18. The valve is provided with a stem 22 which extends outwardly through the screw cap 23 and is rotatably mounted therein so that upon rotation of the handle 24 the valve may be moved toward and away from its seat. Suitable packing as indicated at 25 is provided to make a water tight joint about the valve stem.

The valve 19 in order to receive the end of the rod 11 is provided with a rectangular recess 26 extending a sufficient depth therein to permit seating of the valve before the end of the rod 11 strikes the bottom of the recess. The rod is freely slidable within the recess 26 but owing to the shape of the rod and recess rotation of the rod will also cause rotation of the valve. This makes it possible by rotation of the handle 7 to move the valve toward and away from its seat while the valve may also be moved toward and away from its seat by the handle 24 on the other side of the wall.

The valve 19 is provided with a detachable face 27 for engagement with the seat 18 which face is generally constructed of rubber in order to make a tight joint with the valve seat. This face is held on by means of the nut 28 engaging the screw threaded projection 29 on the valve 19 so that by removal of the nut 28 the valve face 27 may be removed and replaced when it becomes worn. The sliding connection between the rod and the valve 19 makes it possible to withdraw the valve from the casing by rotating it until it passes outwardly beyond the ends of the threads 21 after removal of the cap 23 and this makes it easy to repair or replace the valve.

From the above description and the drawings it will be noted that I have provided a simple and easily repaired dual control for a sill cock whereby the valve controlling the outlet for the water may be located wholly within the building to which the sill cock is applied and yet may be controlled either from within or without the building at the will of the user.

Also, by the novel connection between the exterior operating means and the valve, it is possible to withdraw and repair the valve from within the building without in any way disturbing the connections at the faucet.

Having thus described my invention what I claim as new and desire to secure by Letters Patent of the United States is:

1. In a device of the character described, a faucet, a pipe extending therefrom, a valve casing having its outlet communicating with said pipe, a valve in said casing movable toward and away from said outlet to control the flow of fluid therethrough, a valve rod extending through the faucet and pipe and having connections with said valve for operating the same, said valve being movable endwise relative to said rod.

2. In a device of the character described, a faucet, a pipe extending therefrom, a valve casing having its outlet communicating with said pipe, a valve in said casing movable toward and away from said outlet to control the flow of fluid therethrough, a valve rod extending through the faucet and pipe and having connection with said valve for operating the same, said valve being movable endwise relative to said rod, and means projecting from said casing for moving said valve along said rod toward and away from said outlet.

3. A device of the character described comprising a faucet, a conduit for supplying water to said faucet, a valve casing having its outlet connected to said conduit, a valve in said casing having connection therewith whereby rotation of said valve relative to said casing causes said valve to open or close said outlet and a valve rod extending through the faucet and conduit slidably and non-rotatably engaging said valve whereby rotation of said rod may move said valve to open or close said outlet.

4. A device of the character described comprising a faucet, a conduit for supplying water to said faucet, a valve casing having its outlet connected to said conduit, a valve in said casing having connection therewith whereby rotation of said valve relative to said casing causes said valve to open or close said outlet, a stem in said casing for rotating said valve, and a valve rod extending through the faucet and conduit slidably and non-rotatably engaging said valve whereby rotation of said rod may move said valve to open or close said outlet.

5. A device of the character described comprising a faucet, a conduit for supplying water to said faucet, a valve casing having its outlet connected to said conduit, a valve in said casing having connection therewith whereby rotation of said valve relative to said casing causes said valve to open or close said outlet, and a valve rod extending through the faucet and conduit slidably and non-rotatably engaging said valve whereby rotation of said rod may move said valve to open or close said outlet, said valve being removable from said casing independently of said rod.

6. A device of the character described comprising a faucet, a conduit for supplying water to said faucet, a valve casing having its outlet connected to said conduit, a valve in said casing having connection therewith whereby rotation of said valve relative to said casing causes said valve to open or close said outlet, a stem in said casing for rotating said valve, and a valve rod extending through the faucet and conduit slidably and non-rotatably engaging said valve, whereby rotation of said rod may move said valve to open or close said outlet, said valve being removable from said casing independently of said rod.

In witness whereof, I hereunto subscribe my name this 16th day of January, A. D., 1928.

GEORGE BENSON.